US012759304B2

(12) United States Patent
Ochiai

(10) Patent No.: US 12,759,304 B2
(45) Date of Patent: Oct. 13, 2026

(54) PRINT CONTROL APPARATUS, METHOD OF CONTROLLING PRINT CONTROL APPARATUS, AND STORAGE MEDIUM

(71) Applicant: CANON KABUSHIKI KAISHA, Tokyo (JP)

(72) Inventor: Takayuki Ochiai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 18/977,327

(22) Filed: Dec. 11, 2024

(65) Prior Publication Data

US 2025/0276527 A1 Sep. 4, 2025

(30) Foreign Application Priority Data

Feb. 29, 2024 (JP) ................................ 2024-029477

(51) Int. Cl.
*B41J 2/175* (2006.01)
*B41J 11/00* (2006.01)

(52) U.S. Cl.
CPC ....... *B41J 2/17566* (2013.01); *B41J 2/17509* (2013.01); *B41J 11/006* (2013.01)

(58) Field of Classification Search
CPC .......... B41J 2/17566; B41J 2002/17589; B41J 2/17506
See application file for complete search history.

(56) References Cited

U.S. PATENT DOCUMENTS 9,757,952 B2 9/2017 Tanaka et al.
10,220,634 B2 * 3/2019 Tsuji .................... B41J 2/17566

FOREIGN PATENT DOCUMENTS

CN 116494651 A * 7/2023 .......... B41J 2/17503
JP 2006212853 A * 8/2006
JP 4591002 B2 * 12/2010
JP 2013050602 A * 3/2013
JP 2017080945 A 5/2017

OTHER PUBLICATIONS

Translation of CN_116494651_A (Year: 2026).*
Translation of JP_2006212853_A (Year: 2026).*
Translation of JP_2013050602_A (Year: 2026).*

* cited by examiner

*Primary Examiner* — Howard J Sanders
(74) *Attorney, Agent, or Firm* — ROSSI, KIMMS & McDOWELL LLP

(57) ABSTRACT

A print control apparatus includes a resupplier capable of resupplying a printing agent from a printing agent container, a sheet feeder that feeds a paper sheet from one of supply sources, and a control unit configured to perform control in such a way as not to issue a notification to promote increasing of a remaining level of a printing agent resuppliable from the resupplier in a case where a supply source of a paper sheet being printed is a supply source out of the supply sources which is located at a first position, and to issue the notification in a case where the supply source of the paper sheet being printed is a supply source out of the supply sources which is located at a second position.

19 Claims, 7 Drawing Sheets

FIG.5
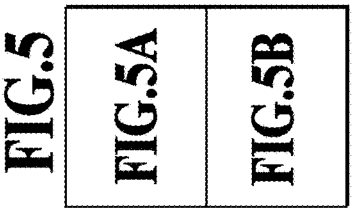
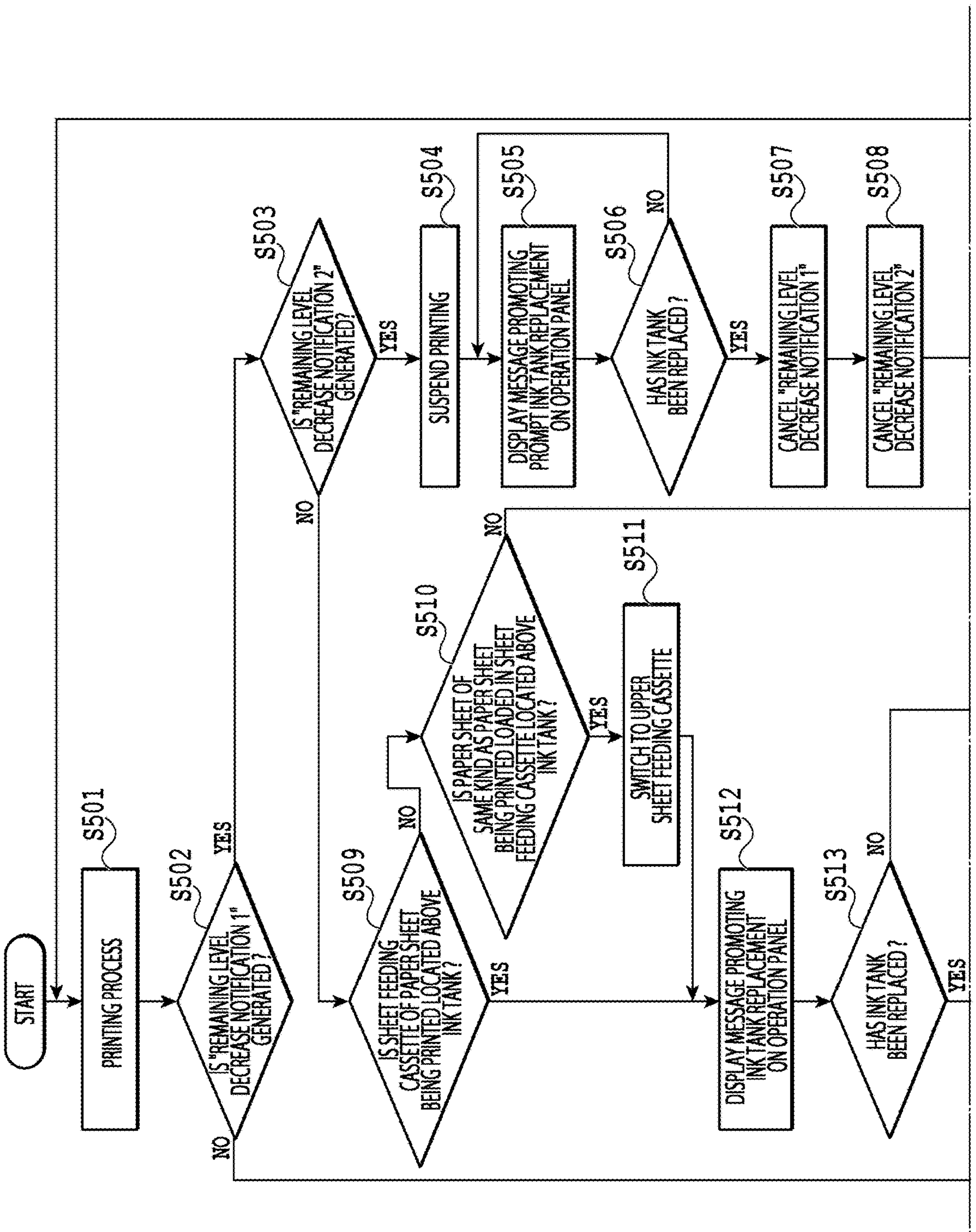
FIG.5A

PRINT CONTROL APPARATUS, METHOD OF CONTROLLING PRINT CONTROL APPARATUS, AND STORAGE MEDIUM

BACKGROUND

Field

The present disclosure relates to a print control apparatus, a method of controlling a print control apparatus, and a storage medium.

Description of the Related Art

Traditionally, a printing apparatus may adopt a full front access structure that enables almost all operations including UI operations, replacement of consumable supplies, and the like from a front face in order to achieve practical space saving or high usability. Such a printing apparatus adopting the full front access structure may further adopt a configuration to allow a sheet feeding path to pass through a front face of an ink tank attaching portion in order to achieve face-down output, a continuous method, throughput, and the like at the same time.

Japanese Patent Laid-Open No. 2017-080945 discloses a printing apparatus that provides an intermediate tank on an ink supply channel so as to enable continuation of printing by using an ink in the intermediate tank even in the case where a cover is opened due to an ink end state in the course of printing.

SUMMARY

In a printing apparatus adopting a configuration to allow a sheet feeding path to pass through a front face of an ink tank attaching portion, an operation by a user to open and close the ink tank attaching portion triggered by display of a message promoting ink tank replacement in the course of printing may affect transportation of paper sheets and cause paper-jamming.

A print control apparatus according to one aspect of the present disclosure includes a resupplier capable of resupplying a printing agent from a printing agent container, a sheet feeder that feeds a paper sheet from one of supply sources, and a control unit configured to perform control in such a way as not to issue a notification to promote increasing of a remaining level of a printing agent resuppliable from the resupplier in a case where a supply source of a paper sheet being printed is a supply source out of the supply sources which is located at a first position, and to issue the notification in a case where the supply source of the paper sheet being printed is a supply source out of the supply sources which is located at a second position.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIGS. 5A and 5B are diagrams illustrating examples of a flow of a printing process.

DESCRIPTION OF THE EMBODIMENTS

An embodiment will be described below in detail with reference to the accompanying drawings. It is to be understood that the following embodiment is not intended to limit the scope of the invention as defined in the appended claims. Although the embodiment describes multiple features, all of these features are not always essential to the invention. Meanwhile, the features may be arbitrarily combined. Moreover, in the accompanying drawings, identical or similar constituents will be denoted by identical reference signs and overlapping explanations thereof will be omitted.

First Embodiment (Apparatus Configuration)

Figure 1:
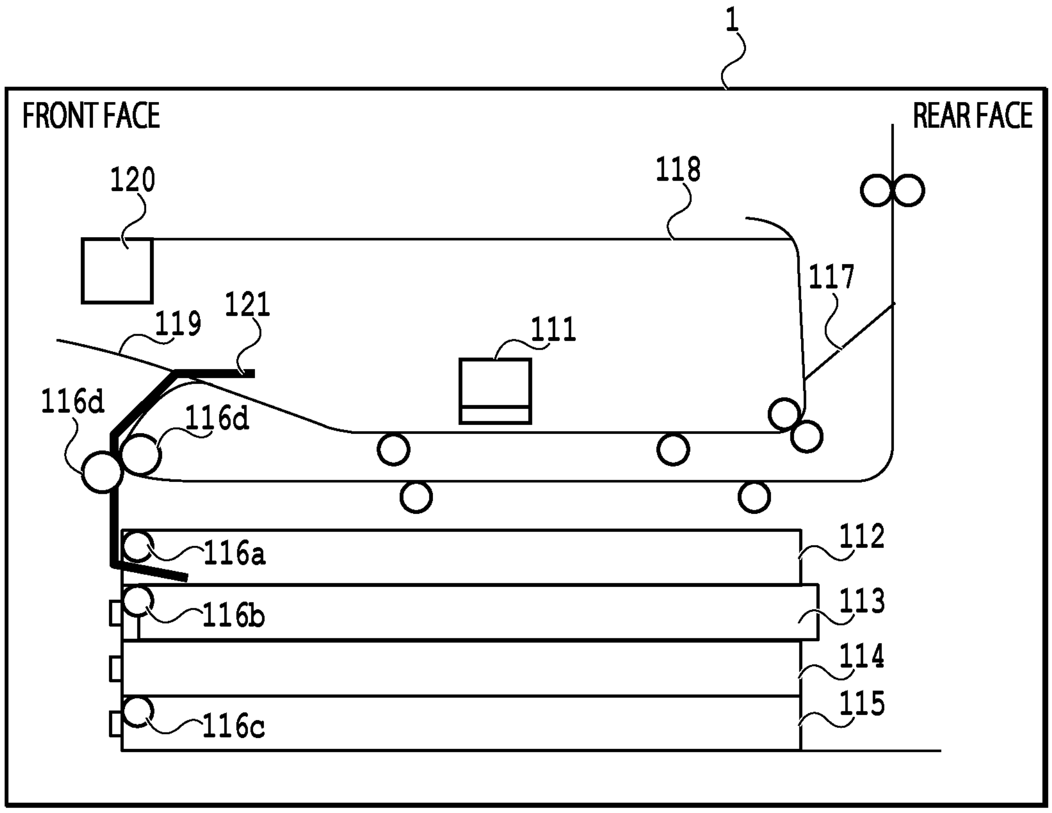
FIG. 1 is a configuration diagram of a printing apparatus.

FIG. 1 is an internal configuration diagram of an ink jet printing apparatus 1 (hereinafter referred to as a printing apparatus 1) used in the present embodiment. The printing apparatus 1 is also referred to as a print control apparatus.

Although the printing apparatus 1 is an apparatus provided with a printing unit, the printing apparatus 1 may adopt a structure as a multifunction peripheral provided with a scanner unit. Although the printing apparatus 1 is provided with three sheet feeding cassettes serving as supply sources, the number of the sheet feeding cassettes does not always have to be three. A sheet feeding cassette 112 is a sheet feeding cassette located uppermost, and a sheet feeding cassette 113 is located below the sheet feeding cassette 112. An ink tank attaching portion 114 is located below the sheet feeding cassette 113. In the case of replacing an ink tank, a user can access the ink tank (a printing agent container) by pulling out the ink tank attaching portion 114 in a direction toward a front face of the apparatus, which is equivalent to a leftward direction in FIG. 1. The ink tank attaching portion 114 is a resupplier of an ink being a printing agent.

The printing apparatus 1 is configured to be capable of adding a sheet feeding cassette in order to meet a need of the user such as storage of a large number of paper sheets in the apparatus or storage of various sizes or kinds of paper sheets therein. In the present embodiment, a sheet feeding cassette 115 is attached below the ink tank attaching portion 114. Transportation rollers are provided in order to establish a sheet feeding path from feeding paper from the sheet feeding cassette to discharging the paper. A transportation roller 116*a* is used in case of pulling out a paper sheet loaded in the sheet feeding cassette 112. A transportation roller 116*b* is used in the case of pulling out a paper sheet loaded in the sheet feeding cassette 113. A transportation roller 116*c* is used in the case of pulling out a paper sheet loaded in the sheet feeding cassette 115.

A printing operation is carried out by using a printing head 111 in the case of printing on the paper sheet. At the time of two-sided printing, the paper sheet is passed through sheet feeding paths for both sides by using an inversion path 117, and the paper sheet that underwent the printing operation is discharged to a sheet discharge path 118. At the time of one-sided printing, a paper sheet that underwent the printing operation is discharged to the sheet discharge path 118.

Instead of the sheet feeding cassette, the paper sheet can also be subjected to printing by being set on a manual feed tray 119.

An operation panel 120 is a mechanism for allowing the user to perform input to and output from the printing apparatus 1. The user can instruct an operation, set a printing mode, and recognize information on the printing apparatus 1 by the intermediary of the operation panel 120.

(Sheet Feeding Operation)

In the case where the sheet feeding cassette 112 is selected and printing is started in a state where paper is set to the sheet feeding cassette 112, the paper is pulled out by using the transportation roller 116*a* attached to the sheet feeding cassette. The paper sheet thus fed is passed through a transportation path (a transportation route) 121, and the printing head 111 is caused to execute the printing operation based on print data. The paper sheet subjected to execution of the printing operation is passed through the sheet discharge path 118 and turned into a state where the printed surface after completion of printing is directed downward (hereinafter referred to as face-down). A configuration of the present embodiment is characterized by the face-down printing and that an operation involving the printing apparatus 1 can be carried out on the front face.

Figure 2:
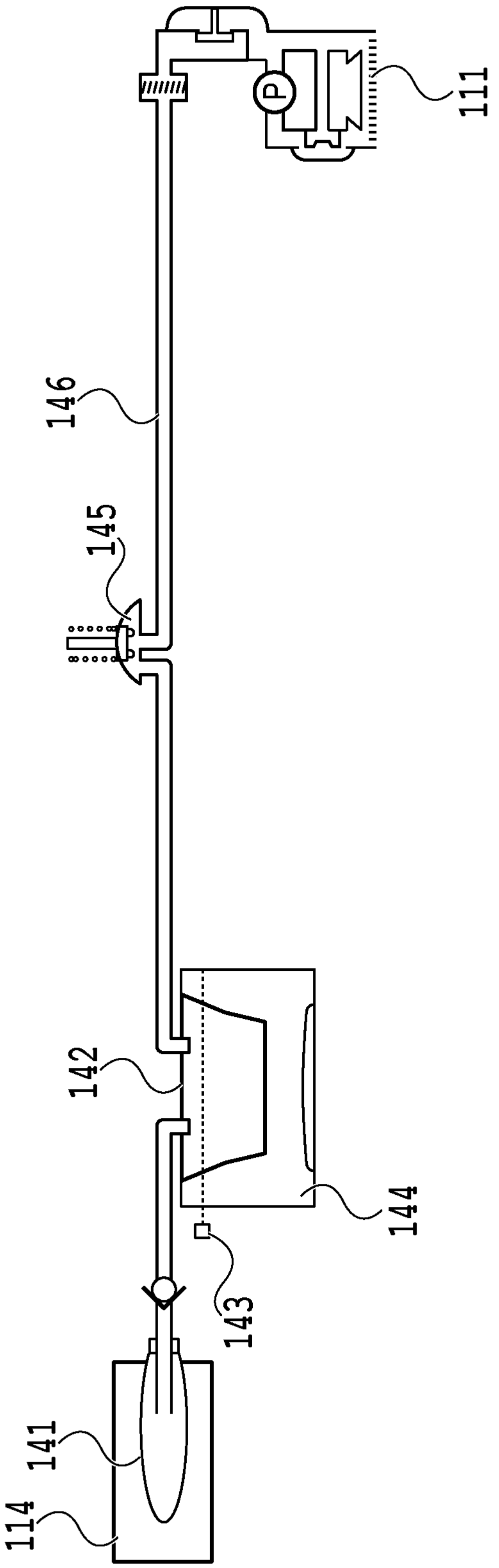
FIG. 2 is a configuration diagram illustrating an ink supply mechanism.

FIG. 2 is an internal configuration diagram of a mechanism concerning ink supply of the printing apparatus 1 used in the present embodiment. An ink tank 141 can be accessed by a mechanical change of the ink tank attaching portion (that is, by pulling out the ink tank attaching portion 114). The ink tank 141 is an ink container (the printing agent container) which may adopt a tank mode of refilling with an ink by plenishment, a cartridge mode that is replaceable by attaching and detaching each tank, and the like. An intermediate tank (a reservoir) 142 is a mechanism for reserving the ink being poured into the ink tank 141. According to this mechanism, even in the case where the ink in the ink tank 141 is depleted, it is still possible to resupply the ink or replace the ink tank 141 while continuing the printing as long as there is the ink left in the intermediate tank 142. Hence, it is possible to perform the printing without stop. The intermediate tank 142 is provided with a remaining level detection sensor 143 for figuring out a remaining level of the ink. According to this sensor, it is possible to figure out an remaining ink level in the intermediate tank 142, thereby determining appropriateness of suctioning the ink from the ink tank 141 or notifying the user of appropriate timing for the ink tank replacement in the case where the remaining ink level falls below a predetermined threshold (such as the remaining level equal to 30%). Note that the present embodiment is premised on a dot counting mode of figuring out the remaining ink level in the ink tank 141 without providing a remaining level detection sensor. However, the ink tank 141 may also be provided with a remaining level detection sensor for detecting the remaining ink level in the ink tank 141 as with the intermediate tank 142.

A pressure chamber 144 is a mechanism for pushing the ink out of the intermediate tank 142. A choke valve 145 is a mechanism for suctioning the ink from the intermediate tank 142. The suctioned ink is supplied to the printing head 111 (the printing unit) through a supply tube 146. According to these structures, it is possible to supply the ink attached to the printing apparatus 1 to the printing head 111 and to perform printing.

In reality, however, the ink tank attaching portion 114 includes ink tanks and intermediate ink tanks for respective ink colors. In the present embodiment, the ink tank attaching portion 114 and the ink tanks for the respective colors will be collectively referred to as a resupplier. Moreover, in the printing apparatus 1 of the present embodiment, the resupplier is assumed to be not provided with a physical lock mechanism for suppressing the mechanical change (that is to say, pulling out the ink tank attaching portion 114). Adoption of the configuration not provided with the lock mechanism makes it possible to reduce costs that would be caused by embedding the lock mechanism. Nevertheless, it is possible to adopt the configuration to provide the lock mechanism instead.

Figure 3:
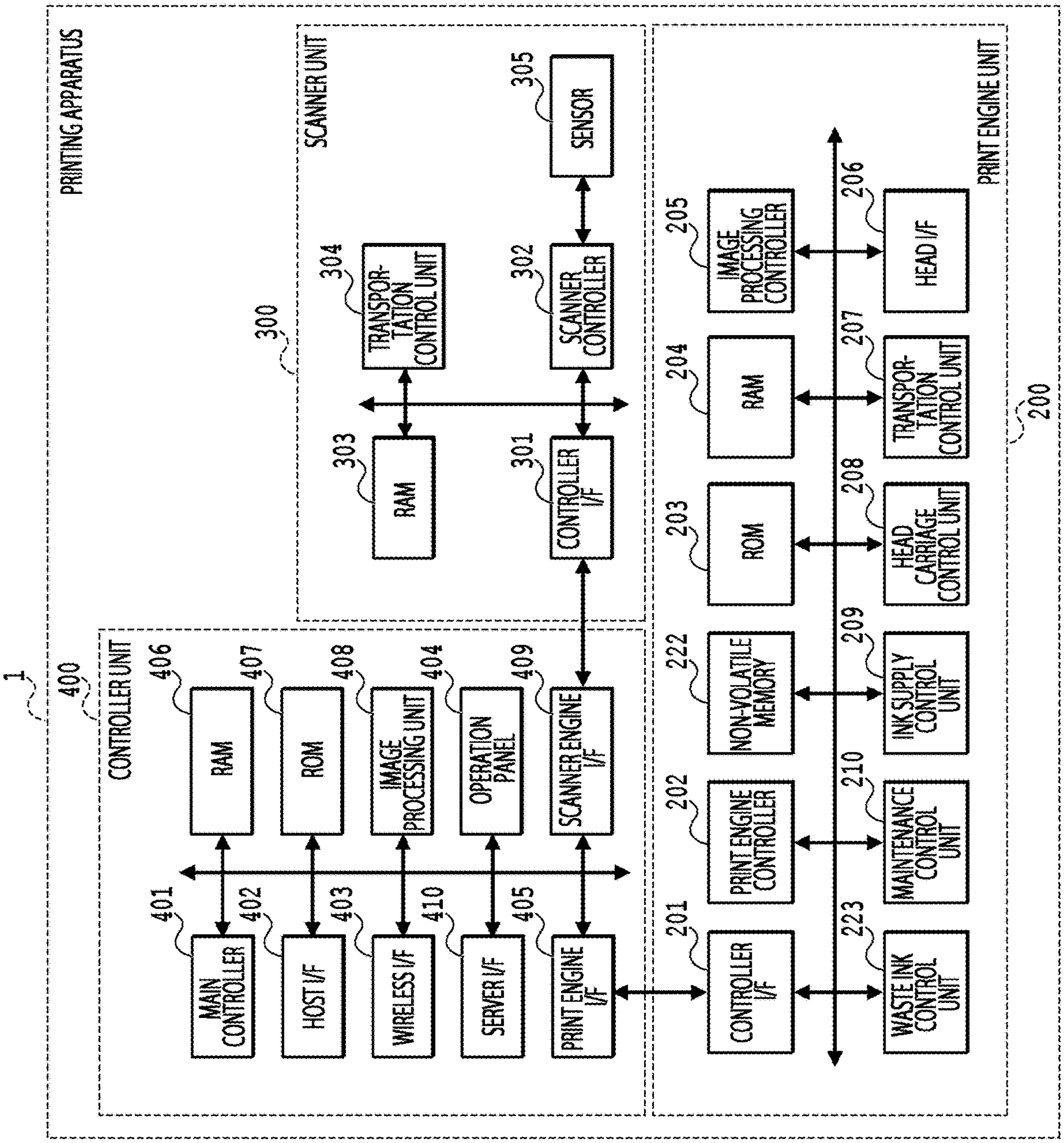
FIG. 3 is a control configuration diagram of the printing apparatus.

FIG. 3 is a block diagram illustrating a control configuration of the printing apparatus 1. The control configuration includes a print engine unit 200 that mainly controls the printing unit, a scanner unit 300 that controls the scanner unit, and a controller unit 400 that controls the entire printing apparatus 1. A print engine controller 202 controls various mechanisms in the print engine unit 200 in accordance with instructions by a main controller 401 of the controller unit 400. Various mechanisms in the scanner unit 300 are controlled by the main controller 401 of the controller unit 400. Details of the control configuration will be described below.

In the controller unit 400, the main controller 401 formed from a CPU controls the entire printing apparatus 1 in accordance with programs and various parameters stored in a ROM 407 while using a RAM 406 as a work area. A print job is inputted from a host through a host I/F 402 or a wireless I/F 403, for example. Meanwhile, the print job is inputted from a server through a server I/F 410, and image data received by an image processing unit 408 is subjected to prescribed image processing in accordance with an instruction by the main controller 401, for example. The main controller 401 transmits the image data subjected to the image processing to the print engine unit 200 through a print engine I/F 405.

An operation panel 404 is a mechanism for allowing the user to input to and output from the printing apparatus 1. The user can instruct operations such as copying and scanning, set up a printing mode, and recognize information on the printing apparatus 1 by using the operation panel 404. The operation panel 404 is capable of displaying a variety of information and is assumed to be provided with a touch panel display that can accept various user operations.

In the print engine unit 200, the print engine controller 202 formed from a CPU controls the various mechanisms in accordance with programs and various parameters stored in a ROM 203 while using a RAM 204 as a work area. In the case where various commands and image data are received through a controller I/F 201, the print engine controller 202 temporarily saves these commands and data in the RAM 204. The print engine controller 202 causes an image processing controller 205 to convert the saved image data into print data so that the printing head 111 can uses the data for a printing operation. In the case where the print data is generated, the print engine controller 202 causes the printing head 111 to execute the printing operation based on the print data through a head I/F 206. In this instance, the print engine controller 202 transports a print medium such as a paper sheet by driving the transportation rollers 116 illustrated in FIG. 1 through a transportation control unit 207. In accordance with instructions from the print engine controller 202, the printing operation is executed by the printing head 111 in conjunction with the transportation control unit 207, a head carriage control unit 208, and an ink supply unit 209, whereby a printing process takes place. A maintenance control unit 210 performs a control process for wiping off an ink adhering to the printing head 111 or detecting an ejection failure.

The print engine controller 202 figures out a remaining level in the ink tank 141 by counting dots of the used ink, and saves the remaining level in a non-volatile memory 222. Such a dot counting mode is a mode of storing an amount of use of the ink in a storage unit such as the ROM 203 in advance, and detecting the remaining ink level of the ink based on the number of times of ink droplets outputted. In the case where the remaining level in the ink tank 141 falls below a predetermined threshold (hereinafter referred to as a first threshold), the print engine controller 202 notifies the main controller 401 of a detection signal (a detection command) that notifies of detection of this event (such a notification will be hereinafter referred to as a remaining level decrease notification 1). A state of generation of the remaining level decrease notification 1 is equivalent to a state of satisfaction of a first condition corresponding to a decrease in remaining level of a printing agent that can be resupplied from the ink tank attaching portion 114 (a state of falling below the first threshold).

The print engine controller 202 also figures out a remaining level in the intermediate tank 142 by using the remaining level detection sensor 143, and saves the remaining level in the non-volatile memory 222. In the case where the remaining level decrease notification 1 is generated and the remaining level in the intermediate tank 142 falls below a predetermined threshold (hereinafter referred to as a second threshold), the print engine controller 202 notifies the main controller 401 of a detection signal (a remaining level decrease notification 2) that notifies of detection of this event. A state of generation of the remaining level decrease notification 2 is equivalent to a state of satisfaction of a second condition corresponding to a decrease in remaining level of the printing agent in the intermediate tank 142 (a state of falling below the second threshold). The generation of each the remaining level decrease notification 1 and the remaining level decrease notification 2 as well as information concerning cancellation of the remaining level decrease notification 1 and the remaining level decrease notification 2 along with replacement of the ink tank or ink refilling is saved in and managed by the non-volatile memory 222. A waste ink control unit 223 has a function to control the ink which is ejected and wasted in a cleaning operation of the printing head 111 and the like.

Data concerning N-in-1 printing (Nis an integer), two-sided printing or one-sided printing, color or black-and-white printing, photograph or document printing, and the like can be set as the various parameters to be stored in the ROM 203, for example. In the case where parameter setting depending on each user is applied to default setting, the print engine controller can receive setting values that are inputted to the operation panel 404 through the print engine I/F and reflect the setting values to print setting.

In the scanner unit 300, the main controller 401 controls hardware resources in a scanner controller 302 in accordance with programs and various parameters stored in the ROM 407 while using the RAM 406 as a work area. Various mechanisms provided to the scanner unit 300 are controlled in this way. By causing the main controller 401 to control the hardware resources in the scanner controller 302 through a controller I/F 301, an original document loaded on an ADF by the user is transported by the intermediary of a transportation control unit 304 and is read by using a sensor 305. Then, the scanner controller 302 saves the read image data in a RAM 303. Here, by converting the obtained image data into the print data as described above, the host I/F 402 can cause the printing head 111 to execute the printing operation based on the image data read by the scanner controller 302.

Explanation of Problem

Figure 4:
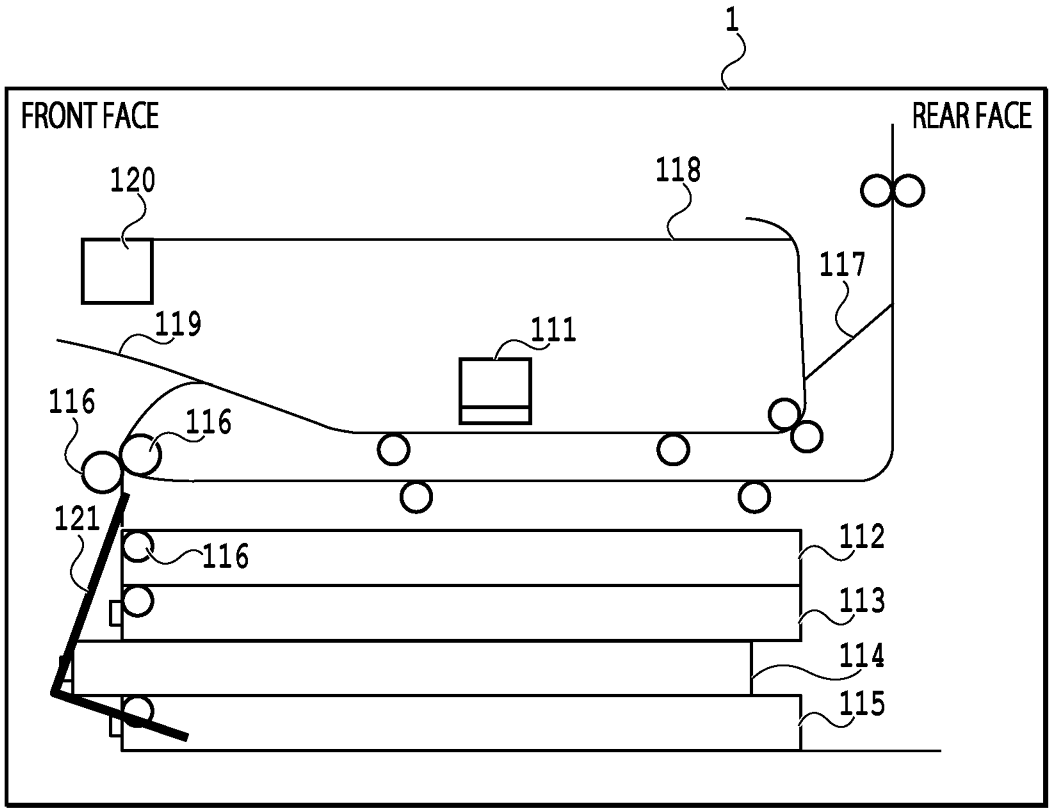
FIG. 4 is a configuration diagram of the printing apparatus in the case where paper-jamming of a supplied paper sheet takes place.

FIG. 4 is a diagram illustrating an aspect of occurrence of paper-jamming in the case where the ink tank attaching portion 114 is pulled out in the course of sheet feeding. In the case where a job for feeding a sheet from the sheet feeding cassette 115 is operated, the paper sheet is fed through a transportation path 121 that passes through front faces of the sheet feeding cassette 112, the sheet feeding cassette 113, and the ink tank attaching portion 114.

If the ink tank attaching portion 114 is pulled out in the case where the paper sheet is being passed through the front face of the relevant sheet feeding cassette, the transportation path 121 overlaps the ink tank attaching portion 114, thus leading to paper-jamming.

However, provision of a lock mechanism in the form of hardware so as to keep the sheet feeding cassette from being pulled out in the case where the transportation path 121 passes through the front face of the sheet feeding cassette in order to solve the above-mentioned problem may cause an increase in cost for implementing lock control.

On the other hand, this problem may be solved by passing the transportation path through a rear face of the sheet feeding cassettes instead of the front faces thereof. However, an attempt to enable face-down output and passage through the rear faces may lengthen the transportation path, thereby posing a concern of printing time or a concern of an increase in size of the apparatus.

Given the circumstances, as a solution for the above-mentioned problem, a description will be given of an exemplary process of switching the sheet feeding cassette depending on a position of the sheet feeding cassette used for printing at the time of a decrease in ink level, thus enabling replacement of the ink tank while continuing the printing. Moreover, a description will also be given of an exemplary process of suppressing the occurrence of paper-jamming by notifying the user of an appropriate timing for replacing the ink tank depending on the position of the sheet feeding cassette used for printing at the time of the decrease in ink level.

Figure 5B:
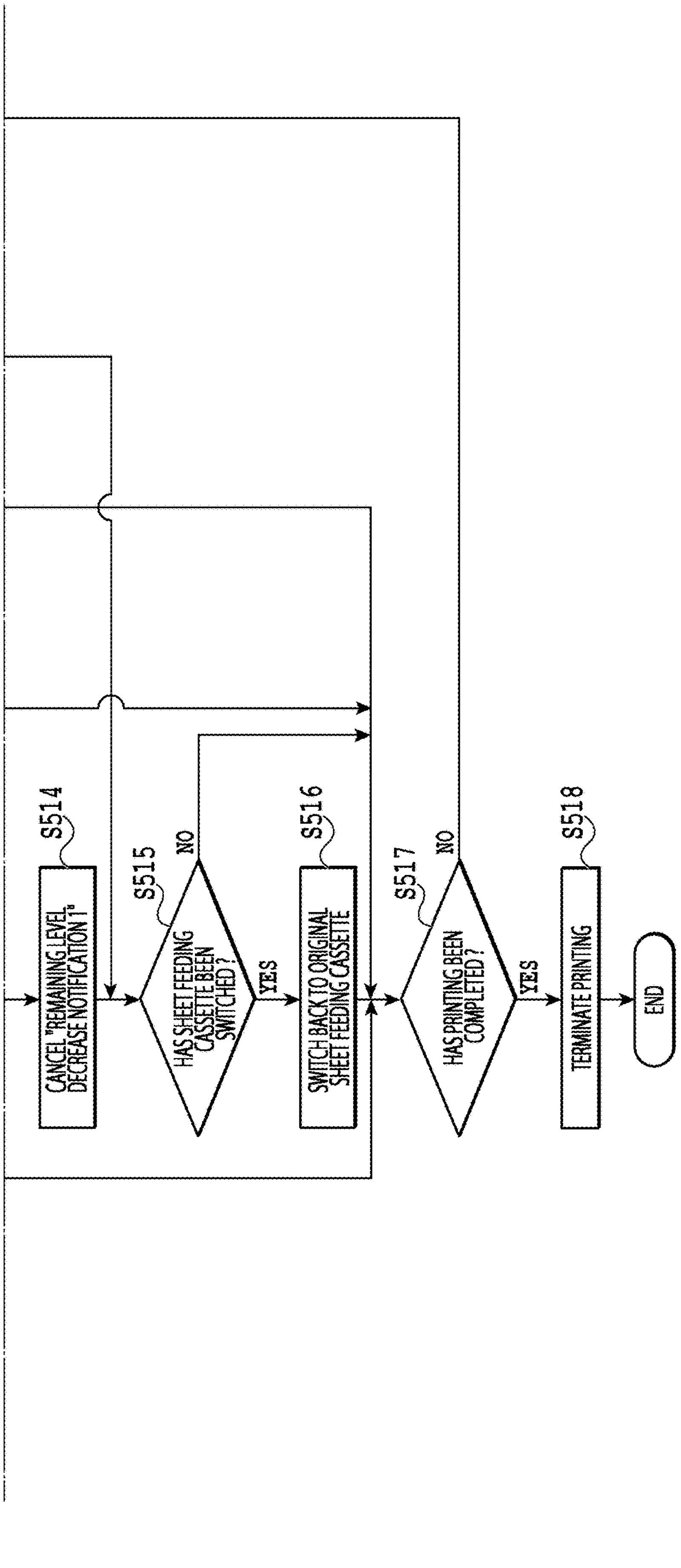

FIGS. 5A and 5B are flowcharts illustrating examples of a flow of a printing process by the printing apparatus according to the present embodiment. The process of this flowchart is executed by causing the main controller 401 included in the printing apparatus 1 to load a program stored in the ROM 407 on the RAM 406, or executed by causing the print engine controller 202 included in the printing apparatus 1 to load a program stored in the ROM 203 on the RAM 204. In the meantime, the process of this flowchart is started in the case where the printing apparatus 1 implements a function that involves the use of the ink such as copying and printing, and is executed by the main controller 401. Note that a sign "S" used in the following explanations of respective procedures represents a step in this flowchart.

In S501, the main controller 401 executes the printing process. Specifically, the main controller 401 executes control to supply the ink (hereinafter referred to as ink supply) from the ink tank 141 to the intermediate tank 142, then to supply the ink from the intermediate tank 142 to the printing head 111, and to perform printing on various media (print media) such as paper sheets. In the case where the print engine controller 202 figures out depletion of the ink in the ink tank 141 at the time of ink supply, the print engine controller 202 generates the remaining level decrease notification 1 and save this information in the non-volatile memory 222.

In S502, the main controller 401 determines whether or not the remaining level decrease notification 1 is generated. As mentioned earlier, the remaining level decrease notification 1 is the signal (the command) notified by the print engine controller 202 to the main controller 401 in the case where the remaining ink level in the ink tank 141 falls below the predetermined threshold. The main controller 401 determines that the remaining level decrease notification 1 is generated in the case where the remaining level decrease notification 1 is received. The process proceeds to step S503 if the remaining level decrease notification 1 is determined to be generated, or proceeds to S517 if not.

In S503, the main controller 401 determines whether or not the remaining level decrease notification 2 is generated. As mentioned earlier, the remaining level decrease notification 2 is the signal (the command) notified by the print engine controller 202 to the main controller 401 in the case where the remaining ink level in the intermediate tank 142 falls below the predetermined threshold in the state where the remaining level decrease notification 1 is generated. The main controller 401 determines that the remaining level decrease notification 2 is generated in the case where the remaining level decrease notification 2 is received. The process proceeds to S504 in the case of determination that the remaining level decrease notification 2 is generated, that is to say, if the remaining ink level in the ink tank 141 falls below the predetermined threshold and the remaining ink level in the intermediate tank 142 also falls below the threshold. The process proceeds to S509 in the case of determination that the remaining level decrease notification 2 is not generated, that is to say, if the remaining ink level in the ink tank 141 falls below the predetermined threshold but there is still the ink remaining in the intermediate tank 142.

In S504, the main controller 401 suspends printing because of an insufficient ink level. Specifically, the main controller 401 performs control in such a way as to suspend the printing irrespective of the position of the supply source of the paper sheet in the case where both the remaining level decrease notification 1 and the remaining level decrease notification 2 are generated.

In S505, the main controller 401 displays a message to promote replacement of the ink tank on the operation panel 404.

Figure 6A:
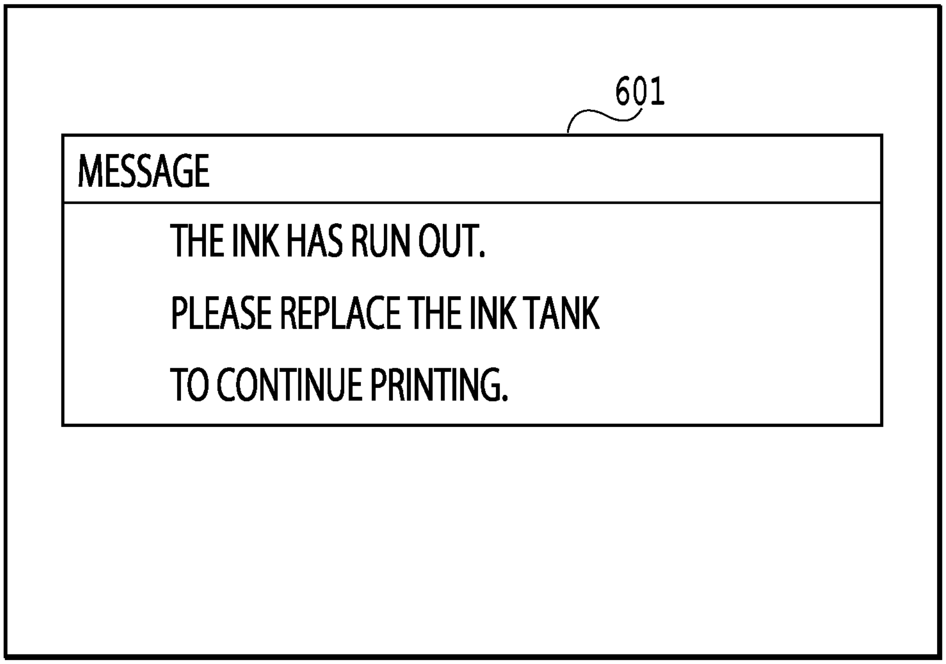
FIGS. 6A and 6B are diagrams illustrating examples of a screen that provides a notification for promoting replacement of an ink tank.
Figure 6B:
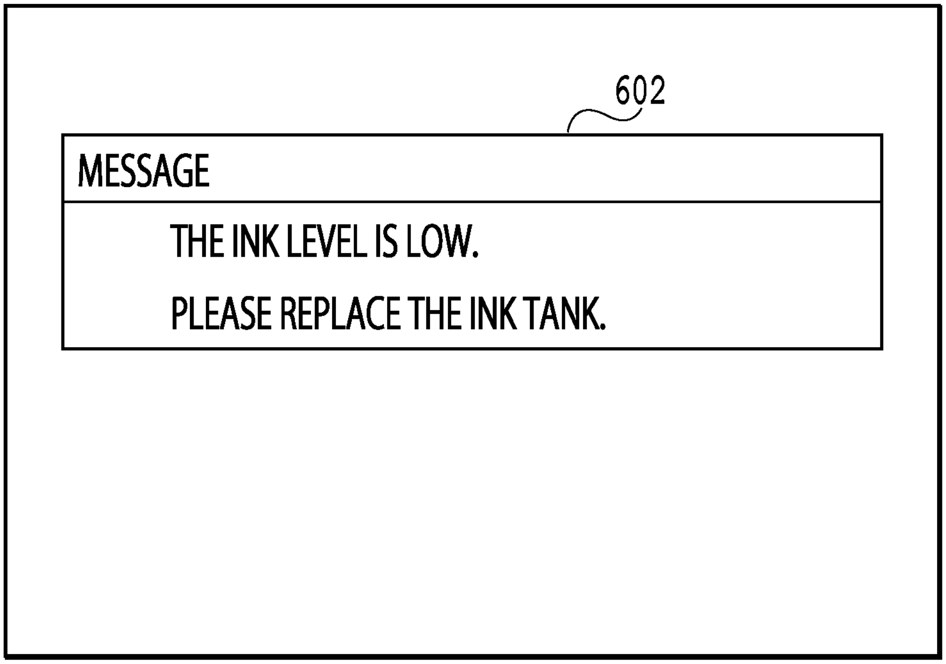

FIGS. 6A and 6B are diagrams illustrating examples of a notification displayed on the operation panel 404 of the printing apparatus 1. In S505, a screen image 601 illustrated in FIG. 6A will be displayed on the operation panel 404.

In S506, the main controller 401 determines whether or not the ink tank that caused suspension of printing (the ink tank with a low ink level) has been replaced. In the printing apparatus 1 of the present embodiment, the ink tank 141 is of a cartridge type and ink tank replacement is determined by a change in IC chip attached to the ink tank 141. However, the method of determination is not limited thereto. There is more than one method of determination of the ink tank replacement. In the case of a tank type, for example, it is possible to perform determination by checking an increase in ink level to a threshold or above by using the remaining level detection sensor. Alternatively, it is also possible to adopt a method of allowing the user to input an action of replacement by using the operation panel 404, and the like. The main controller 401 proceeds to S507 in the case of determination that the ink tank has been replaced. In the case of determination that the ink tank has not been replaced, the main controller 401 returns to S505 and continues display of the message to promote the ink tank replacement. Specifically, the screen image 601 illustrated in FIG. 6A is the image diagram to be displayed on the operation panel 404, which will be continuously displayed until the operation to replace the ink tank described with reference to FIG. 5 is carried out.

In S507, the main controller 401 deletes (cancels) the information concerning the generation of the remaining level decrease notification 1 in response to completion of the ink tank replacement. Specifically, the main controller 401 resets the state of reception of the remaining level decrease notification 1. Meanwhile, in S508, the main controller 401 deletes (cancels) the information concerning the increase in remaining ink level in the intermediate tank 142 as a consequence of the ink tank replacement, and concerning the generation of the remaining level decrease notification 2 in response to cancellation of the remaining level decrease notification 1. Here, if the remaining level decrease notification 1 and the remaining level decrease notification 2 are cancelled as a consequence of the ink tank replacement, the main controller 401 performs control in such a way as to discontinue the display of FIG. 6A which is displayed on the operation panel 120 in S505.

In S509, the main controller 401 determines whether or not a supply source (the sheet feeding cassette) of the paper sheet being printed is located upstream of the ink tank attaching portion 114 (closer to the printing head 111 than the ink tank attaching portion 114 is). The process proceeds to S512 in the case of determination that the sheet feeding cassette of the paper sheet being printed is located above the ink tank. The process proceeds to S510 if not.

In S512, the main controller 401 causes the operation panel 404 to display a message as illustrated in FIG. 6B, which promotes replacement of the ink tank. This display is a notification to promote an increase in remaining level of the ink (the printing agent) in the ink resupplier. A screen image 602 is an image diagram to be displayed on the operation panel 404. However, instead of continuous display in the course of printing, this screen image may be displayed for a certain period in the form of pop-up, or may be deleted when the user touches the operation panel 404. In this case, since the sheet feeding cassette of the paper sheet being printed is located above the ink tank attaching portion 114, opening and closing actions of the ink tank attaching portion 114 do not overlap the transportation path 121. Accordingly, paper-jamming does not occur even if the ink tank attaching portion 114 is pulled out, and the user is therefore urged to replace the ink tank 141 in order to continue printing. If the ink tank 141 is not replaceable but is instead replenishable, the operation panel 404 performs display that promotes replenishment of the ink tank 141 with the ink in S512.

In S510, the main controller 401 determines whether or not a paper sheet of the same kind (type) as the paper sheet being printed is also loaded in the sheet feeding cassette located above the ink tank attaching portion 114 (closer to the printing head 111 than the ink tank attaching portion 114 is) (in other words, whether or not the paper sheet is feedable). The process proceeds to S511 in the case of the determination that the paper sheet of the same kind as the paper sheet being printed is loaded in the sheet feeding cassette located above the ink tank attaching portion 114. If not, the process proceeds to S517 without urging the user to replace the ink tank 141.

In S511, the main controller 401 saves information on the sheet feeding cassette before switching in the RAM 204.

Thereafter, the printing is continued by switching (changing) the supply source (a transportation source) of the paper sheet to the sheet feeding cassette being located above and loading the paper sheet of the same kind as the paper sheet being printed, which is determined to be present in S510. A case of determination as NO in S509 corresponds to a case where the relevant sheet feeding cassette is located below the ink tank attaching portion 114. As described above, the transportation path 121 may be blocked if the ink tank attaching portion 114 is opened or closed in this case. Hence, there is a possibility of occurrence of paper-jamming. Given the circumstances, the supply source of the paper sheet is switched to the sheet feeding cassette located above the ink tank attaching portion 114 (closer to the printing head 111 than the ink tank attaching portion 114 is) by performing the control in S510 and S511 in the first place. As a consequence of this switching process, the transportation path 121 will not be blocked even if the ink tank attaching portion 114 is pulled out in the course of printing, and paper-jamming will not occur in this state. Thereafter, the process proceeds to S512 to perform the display to promote the replacement of the relevant ink tank as illustrated in FIG. 6B.

On the other hand, if the sheet feeding cassette is located below the ink tank attaching portion 114 and it is not possible to switch to the sheet feeding cassette located above the ink tank attaching portion 114 (in the case of determination as NO in S510), the process proceeds to S517 without carrying out the display in S512. In other words, the process proceeds to S517 without performing the control in such a way as to perform control to urge the user to replace the ink tank 141. In this way, a situation where the user carelessly pulls out the ink tank attaching portion 114 and causes paper-jamming is avoided.

In S513, the main controller 401 determines whether or not the ink tank corresponding to the remaining level decrease notification 2 has been replaced. The process proceeds to S514 if the ink tank has been replaced, or proceeds to S517 if not. In S514, the cancellation process of the remaining level decrease notification 1 is carried out as with S507, and control to discontinue the display of FIG. 6B displayed in S512 is carried out.

In S515, the main controller 401 determines whether or not the sheet feeding cassettes are switched in S511. The process proceeds to S516 in the case of determination that the sheet feeding cassettes are switched, or the process proceeds to S517 if not.

In S516, the main controller 401 switches the supply source (the transportation source) of the paper sheet back to the original sheet feeding cassette before the switching in S511 based on the information on the sheet feeding cassette before the switching that has been saved in the RAM 204 in S511 (a switching back process). Although this switching back process of the sheet feeding cassette has been described as a process to be automatically carried out, a screen that enables selection as to whether or not to perform the switching back process may be displayed on the operation panel 404 so as to cause the user to perform selection.

In S517, the main controller 401 determines whether or not a series of printing has been completed. In the case of the determination that the series of printing has not been completed, the main controller 401 returns to S501 and continues the series of processing. In the case where printing of 1000 sheets has been instructed, for example, the main controller 401 continues to carry out the printing of the remaining sheets. The process of this flowchart is terminated in the case of the determination that the series of printing has been completed.

As described above, according to the present embodiment, it is possible to reduce the occurrence of a failure to transport a paper sheet in the course of printing. To be more precise, in the case where the supply source of the paper sheet being printed is located above the ink tank attaching portion 114, the transportation path of the paper sheet does not overlap the opening and closing actions of the ink tank attaching portion, and paper-jamming therefore does not occur. Accordingly, the notification for urging the user to replace the ink tank is displayed at time of a decrease in ink level. This configuration makes it possible to carry out continuous printing in the case of a low remaining ink level by replacing the ink tank without suspending the printing.

On the other hand, in the case where the supply source of the paper sheet being printed is located below the ink tank attaching portion 114 (farther from the printing head 111), the transportation path of the paper sheet overlaps the opening and closing actions of the ink tank attaching portion, and paper-jamming is therefore likely to occur. For this reason, an attempt is first made to switch the cassette serving as the supply source (the transportation source) to the one loading the same paper and being located above the ink tank attaching portion 114 (closer to the printing head 111). If the cassette is switchable, the cassette is switched in the process in S511 and then the notification to urge the user to replace the ink tank is displayed. In this way, it is possible to continue the printing by replacing the ink tank without suspending the printing or causing a failure in transporting the paper sheet even in the case of a low remaining ink level.

In the meantime, the control will be carried out as described below in the case where the supply source is located farther form the printing head 111 than the ink tank attaching portion 114 is and where the cassette of the supply source cannot be switched to the one located above the ink tank attaching portion 114. Specifically, the printing is executed without displaying the notification to promote the ink tank replacement so as to keep the user from pulling out the ink tank attaching portion 114 even in the case of the decrease in ink level. The user will not recognize the decrease in ink level unless the notification to promote the ink tank replacement is displayed on the operation panel. Hence, it is unlikely that the user replaces the ink tank. In this way, a situation in which the ink tank attaching portion blocks the transportation of the paper sheet can be prevented. As described above, it is possible to execute the printing so as not to cause paper-jamming depending on the situation.

The above-described embodiment has explained the aspect of using the ink as the printing agent used for the printing. However, the printing agent is not limited to the ink but may be a toner, for example.

The above-described embodiment has discussed the process in the case where the ink level is decreased in the course of execution of printing. Here, there may also be a case where paper sheets run out in the course of printing. In the flowchart for performing the process to reduce the occurrence of a failure in transportation of the paper sheet as illustrated in FIG. 5, in the case where the paper sheets in the sheet feeding cassette being used for printing run out, a determination is made as to whether or not the paper sheets of the same kind are loaded in any of the sheet feeding cassettes located at different positions. If the paper sheets of the same kind are loaded on both of the sheet feeding cassettes located above and below the ink tank attaching portion the sheet feeding cassette is switched to the one located above so as to enable display of the notification to promote the ink tank replacement without suspending the printing in the case of a decrease in ink level. If the paper sheets of the same kind are loaded on the sheet feeding cassette located below the ink tank attaching portion the sheet feeding cassette is switched to the lower ink tank attaching portion and then the process illustrated in FIG. 5 may be carried out in the case of a decrease in ink level. If none of the sheet feeding cassettes load the paper sheets of the same kind, then the printing may be suspended until the paper sheets are located by the user.

In the meantime, the printing apparatus of the above-described embodiment has been explained as the configuration to locate the printing unit and the discharge path above the ink tank attaching portion and the sheet feeding cassettes as illustrated in FIG. 1. However, the printing apparatus does not always have this configuration in reality. The above-described embodiment may also be applied to a printing apparatus configured to locate the printing unit and the discharge path below the ink tank attaching portion and the sheet feeding cassettes. In this case, the process in the case of a decrease in ink level may be implemented by vertically inverting the concept of the above-described embodiment. Specifically, in the case where the sheet feeding cassette is located above the ink tank attaching portion, the opening and closing actions of the ink tank attaching portion may overlap the transportation path of the paper sheet. Accordingly, the notification to promote prompt ink tank replacement is not displayed. On the other hand, in the case where the sheet feeding cassette is located below the ink tank attaching portion, the opening and closing actions of the ink tank attaching portion do not overlap the transportation path of the paper sheet. Accordingly, the notification to promote prompt ink tank replacement is displayed in the case of a decrease in ink level. After all, the display to the user may be carried out in such a way as to avoid overlap of the opening and closing actions of the ink tank attaching portion and the transportation path of the paper sheet being printed.

Note that the various control operations described above as the operations to be carried out by the main controller 401 may be carried out by a single piece of hardware. Alternatively, two or more pieces of hardware (such as two or more processors or circuits) may share the processes in controlling the entire apparatus.

OTHER EMBODIMENTS

The present disclosure can also be realized in the form of processing to be implemented by supplying a program to materialize one or more functions of the above-described embodiment to a system or an apparatus by way of a network or a storage medium, and causing one or more processors in the system or a computer in the apparatus to read and execute the program. Meanwhile, the present disclosure can also be realized by using a circuit (such as an ASIC) to materialize the one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-029477, filed Feb. 29, 2024, which is hereby incorporated by reference wherein in its entirety.

What is claimed is:

1. A print control apparatus comprising:
- a resupplier capable of resupplying a printing agent from a printing agent container;
- a sheet feeder that feeds a paper sheet from one of a plurality of supply sources; and
- at least one memory and at least one processor which function as a control unit configured to perform control in such a way as not to issue a notification to promote increasing of a remaining level of the printing agent resuppliable from the resupplier in a case where a supply source of a paper sheet being printed is a supply source out of the plurality of supply sources which is located at a first position, and to issue the notification in a case where the supply source of the paper sheet being printed is a supply source out of the plurality of supply sources which is located at a second position.

2. The print control apparatus according to claim 1, wherein
- the first position is a position farther from a printing unit configured to perform printing on the paper sheet than the resupplier is, and
- the second position is a position closer to the printing unit than the resupplier is.

3. The print control apparatus according to claim 1, wherein the notification is a notification to promote replacement of the printing agent container in the resupplier.

4. The print control apparatus according to claim 1, wherein the notification is a notification to promote replenishment of the printing agent container in the resupplier with the printing agent.

5. The print control apparatus according to claim 1, wherein a mechanical change of the resupplier in a case of increasing the remaining level of the printing agent resuppliable from the resupplier blocks transportation of the paper sheet on a transportation path from the supply source located at the first position to a printing unit configured to execute printing.

6. The print control apparatus according to claim 5, wherein the mechanical change is an action to pull out the resupplier in a front face direction of the print control apparatus.

7. The print control apparatus according to claim 5, wherein the resupplier is not provided with a physical lock mechanism that suppresses the mechanical change.

8. The print control apparatus according to claim 1, wherein a mechanical change of the resupplier in a case of increasing the remaining level of the printing agent resuppliable from the resupplier does not block transportation of the paper sheet on a transportation path from the supply source located at the second position to a printing unit configured to execute printing.

9. The print control apparatus according to claim 1, further comprising:

a reservoir that reserves the printing agent resupplied from the resupplier.

10. The print control apparatus according to claim 9, wherein in a case where both of a remaining level of the printing agent in the printing agent container and a remaining level of the printing agent in the reservoir are below thresholds defined for the respective remaining levels irrespective of the position of the supply source of the paper sheet being printed, the control unit suspends printing and issues the notification to promote increasing of the remaining level of the printing agent resuppliable from the resupplier.

11. The print control apparatus according to claim 9, wherein the control unit continues printing and issues the notification in a case where a remaining level of the printing agent in the printing agent container is below a first threshold, a remaining level of the printing agent in the reservoir is equal to or above a second threshold, and the supply source of the paper sheet being printed is the supply source out of the plurality of supply sources which is located at the second position in a course of printing.

12. The print control apparatus according to claim 11, wherein the control unit performs control to discontinue display of the notification in a case where the remaining level of the printing agent in the printing agent container is increased to the first threshold or above.

13. The print control apparatus according to claim 9, wherein the control unit continues printing without issuing the notification in a case where a remaining level of the printing agent in the printing agent container is below a first threshold, a remaining level of the printing agent in the reservoir is equal to or above a second threshold, and the supply source of the paper sheet being printed is the supply source out of the plurality of supply sources which is located at the first position in a course of printing.

14. The print control apparatus according to claim 13, wherein in a case where the supply source located at the second position is capable of supplying a print sheet of an identical kind to the print sheet supplied by the supply source located at the first position, the control unit continues printing and performs control to issue the notification after switching the supply source of the paper sheet being printed from the supply source located at the first position to the supply source located at the second position.

15. The print control apparatus according to claim 14, wherein in a case where the remaining level of the printing agent in the printing agent container is increased to the first threshold or above, the control unit performs control to switch the supply source of the paper sheet being printed back to the supply source located at the first position.

16. The print control apparatus according to claim 1, wherein the printing agent is any of an ink and a toner.

17. The print control apparatus according to claim 1, wherein the print control apparatus includes the resuppliers so as to correspond to colors of inks or toners, respectively.

18. A method of controlling a print control apparatus provided with a resupplier capable of resupplying a printing agent from a printing agent container, comprising:

feeding a paper sheet from one of a plurality of supply sources; and controlling in such a way as not to issue a notification to promote increasing of a remaining level of a printing agent resuppliable from the resupplier in a case where a supply source of a paper sheet being printed is a supply source out of the plurality of supply sources which is located at a first position, and to issue the notification in a case where the supply source of the paper sheet being printed is a supply source out of the plurality of supply sources which is located at a second position.

19. A non-transitory computer readable storage medium storing a program which functions in a print control apparatus and causes the print control apparatus to function as:

a resupplier capable of resupplying a printing agent from a printing agent container;

a sheet feeder that feeds a paper sheet from one of a plurality of supply sources; and a control unit configured to perform control in such a way as not to issue a notification to promote increasing of a remaining level of a printing agent resuppliable from the resupplier in a case where a supply source of a paper sheet being printed is a supply source out of the plurality of supply sources which is located at a first position, and to issue the notification in a case where the supply source of the paper sheet being printed is a supply source out of the plurality of supply sources which is located at a second position.

* * * * *